United States Patent [19]

Sittenthaler et al.

[11] Patent Number: 4,833,187

[45] Date of Patent: May 23, 1989

[54] SILICONE-CONTAINING PAINT COMPOSITIONS

[75] Inventors: Wilhelm Sittenthaler; Klaus Marquardt; Bernward Deubzer; Anton Eglseder, all of Burghausen, Fed. Rep. of Germany

[73] Assignee: Wacker-Chemie GmbH, Munich, Fed. Rep. of Germany

[21] Appl. No.: 173,852

[22] Filed: Mar. 28, 1988

[30] Foreign Application Priority Data

Apr. 16, 1987 [DE] Fed. Rep. of Germany ....... 3713126

[51] Int. Cl.⁴ ............................................... C08K 5/54
[52] U.S. Cl. ................................... 524/188; 525/104; 525/479; 524/268; 524/261; 524/262; 524/265; 524/267; 524/457
[58] Field of Search ................ 525/104, 479; 524/268, 524/188, 261, 262, 265, 267, 457

[56] References Cited

U.S. PATENT DOCUMENTS 3,294,709 12/1966 Nitzsche et al. ...................... 260/23
4,423,095 12/1983 Blizzard ................................ 525/56

FOREIGN PATENT DOCUMENTS 1284007 11/1968 Fed. Rep. of Germany .

OTHER PUBLICATIONS

Noel, Chemistry and Technology of Silicones, pp. 90 and 265, Academic Press, New York, 1971.

*Primary Examiner*—Melvyn I. Marquis

[57] ABSTRACT

Silicone containing paint compositions containing aqueous dispersions of
(a) organopolysiloxanes; and
(b) an ethylene-vinyl chloride copolymer which does not exceed the weight of the organopolysiloxanes.

9 Claims, No Drawings

SILICONE-CONTAINING PAINT COMPOSITIONS

The present invention relates to silicone-containing paint compositions and more particularly to pigmented silicone-containing paint compositions which may be applied as a coating to mineral substrates.

BACKGROUND OF THE INVENTION

Paint compositions containing aqueous dispersions of organopolysiloxanes and organic resins containing alkali metal salts of silicic acid or methylsilicic acid are described, for example, in DE-PS 1,284,007 (issued Aug. 7, 1969, S. Nitzsche et al). Also, DE-AS 1,671,280 describes compositions containing solutions of methylpolysiloxanes in organic solvents as impregnating agents for building materials.

It is, therefore, an object of the present invention to provide pigmented paint compositions. Another object of the present invention is to provide paint compositions which impart hydrophobic properties to surfaces coated therewith. Still another object of the present invention is to provide paint compositions which, when applied to substrates, form a film having a high permeability to carbon dioxide and water vapor. A further object of the present invention is to provide pigmented polysiloxane paints which, when applied to substrates, have good resistance to weathering.

SUMMARY OF THE INVENTION

The foregoing objects and others which will become apparent from the following description are accomplished in accordance with this invention, generally speaking, by providing paint compositions containing aqueous dispersions of
 (a) organopolysiloxanes, and
 (b) an organic polymer which does not exceed the weight of the organopolysiloxanes (a), in which the organic polymer (b) is an ethylene-vinyl chloride copolymer.

DESCRIPTION OF THE INVENTION

The preferred organopolysiloxanes contained in the paint compositions of this invention are those of the formula $$R_nSi(OR')_mO_{\frac{4-n-m}{2}} \quad (I)$$

in which the R radicals represent the same or different hydrocarbon radicals which may be substituted by amino or halogen radicals and have from 1 to 18 carbon atoms, the hydrocarbon chain of which can be interrupted by amino groups or oxygen atoms, R' represents hydrogen atoms or alkyl radicals having from 1 to 3 carbon atoms, m is a number having an average of from 0 to 0.5, n is a number having an average of from 0.5 to 2.2, preferably 0.9 to 1.7 and the sum of m and n should not exceed the number 3.

Preferred radicals represented by R' are the methyl and ethyl radicals and the hydrogen atom. Preferred radicals represented by R are alkyl, cycloalkyl, aryl, alkaryl and aralkyl radicals which have from 1 to 12 carbon atoms and are optionally substituted by amino, fluorine or chlorine radicals.

Examples of preferred R radicals are alkyl radicals, such as the methyl, ethyl, n-propyl, iso-propyl, n-butyl, sec-butyl or t-butyl radicals, pentyl radicals, such as the n-pentyl and neo-pentyl radicals, hexyl radicals, such as the n-hexyl radical, heptyl radicals, octyl radicals, such as the n-octyl, 2,2,4-trimethylpentyl and isooctyl radicals, and nonyl, decyl, undecyl and dodecyl radicals; aryl radicals, such as the phenyl radical; alkaryl radicals, such as o-, m- or p-tolyl radicals and xylyl radicals; and aralkyl radicals, such as the benzyl and 2-phenylethyl radicals.

Examples of amino-substituted radicals represented by R are aminoalkyl radicals, such as the aminomethyl, aminoethyl, 3-amino-n-propyl, N,N-dimethylamino-n-propyl or N-(2-aminoethyl)-3-aminopropyl radicals, the N,N-dimethylaminoethyl, N,N-diethylaminoethyl or N,N-diethylamino-n-propyl radicals, aminodecyl radicals, aminododecyl radicals and many others.

Examples of halogenated radicals represented by R are the chloromethyl, trifluoromethyl, 3,3,3-trifluoro-n-propyl or 2,2,2,2',2',2'-hexafluoroisopropyl radicals, hexafluoro-isopropyloxypropyl radicals, chlorophenyl radicals and many similar radicals.

Examples of R radicals in which a hydrocarbon chain is interrupted by oxygen atoms are the ethoxy-n-propyl and methoxy-n-propyl radicals.

Preferred R radicals are alkyl, alkaryl, aralkyl, cycloalkyl and aryl radicals which have from 1 to 12 carbon atoms and are optionally substituted by amino radicals.

It is possible to use only one type of polysiloxane or a mixture of at least 2 different types of organopolysiloxanes in the paints of this invention. Mixtures containing at least one silicone resin and at least one polydiorganosiloxane having amino functional groups are preferred.

A mixture containing silicone resins of the formula $$R''SiO_{3/2} \quad (II)$$

and linear polydiorganosiloxanes of the formula $$R'''_3SiO-[Si(R''')-O]_xSiR'''_3 \quad (III)$$

in which the R'' radicals represent the same or different hydrocarbon radicals having from 1 to 10 carbon atoms, such as alkyl, cycloalkyl, aryl, aralkyl and alkaryl radicals, and the preferred R''' radicals, which may be the same or different, are alkyl radicals having from 1 to 10 carbon atoms or amino- or aminoalkyl-substituted alkyl radicals having a total of not more than 10 carbon atoms is especially preferred.

More preferably, the R''' radicals are methyl and phenyl radicals and amino- and aminoalkyl-substituted alkyl radicals having from 1 to 8 carbon atoms, such as, for example, the examples of amino-substituted radicals cited above for R, with the exception of the aminodecyl and aminododecyl radicals, and with the proviso that an average of at least one R''' radical per molecule has an amino functionality.

In the above formula, x is an integer having an average of at least 60.

In addition to the organopolysiloxanes described above, the silicone-containing paint compositions of this invention contain ethylene-vinyl chloride copolymers. These copolymers are preferably prepared from 1 to 50 percent by weight of ethylene and 99 to 1 percent by weight of at least one other monomer, the other monomers consisting of from 60 to 100 percent by weight of vinyl chloride and from 40 to 0 percent by weight of additional monomers.

Examples of additional monomers which may be included are:

1. Vinyl esters, such as vinyl acetate, vinyl propionate, vinyl butyrate and vinyl stearate.
2. (Meth)acrylic acid esters and crotonic acid esters, such as the methyl, ethyl, propyl, butyl, 2-ethylhexyl, lauryl and stearyl esters of these acids.
3. Dialkyl esters of ethylenically unsaturated $C_4$- to $C_{18}$-alkyl esters of maleic, fumaric and itaconic acids.
4. Alpha-olefins, such as propylene, butylene, styrene, vinyltoluene, vinyl ethers and vinyl ketones.
5. Vinyl and vinylidene halides, such as vinyl fluoride and bromide and vinylidene chloride.

Ethylene-vinyl chloride copolymers are well known and can be prepared, inter alia, from their monomers by emulsion polymerization, along with the addition of additives which are generally employed.

Aqueous ethylene-vinyl chloride copolymer dispersions and their preparation are described, for example, in AU-A 88,920,82 (laid open on Apr. 14, 1983, Wacker-Chemie GmbH) and EP-B 124,759 (issued on Dec. 30, 1986, corresponding to CA Application No. 451,209, Wacker-Chemie GmbH). Corresponding redispersible powders are known from EP-A 149,098 (laid open on July 24, 1985, corresponding to U.S. patent application No. 665,787, filed on 10/29/84, Wacker-Chemie GmbH).

The ethylene-vinyl chloride copolymers are preferably mixed in the form of aqueous dispersions or redispersible powders with the other components of the silicone-containing paint compositions according to the present invention.

The organopolysiloxanes contained in the silicone-containing paint compositions of this invention are preferably mixed in the form of aqueous dispersions with the ethylene-vinyl chloride copolymer and the other components of the paints.

The weight ratio of organopolysiloxanes (a) to ethylene-vinyl chloride copolymer (b) may range from 10:1 to 1:1, preferably from 4:1 to 1:1 and more preferably from 3:1 to 1.5:1.

The amount of the ethylene-vinyl chloride copolymer in the paint composition (silicone resin paint) is preferably from 1 to 5 percent, and more preferably from 2 to 3 percent by weight based on the weight of the paint composition.

The silicone-containing paint compositions of this invention preferably contain pigments as an additional component (c), in addition to the organopolysiloxanes (a) and the ethylene-vinyl chloride copolymer (b).

Preferred pigments are powdered inorganic pigments, for example, titanium dioxide, talc, chalk, precipitated calcium carbonate, satin white (calcium aluminum sulphate), baryte, iron oxide, chromium oxide, dolomite and carbon black. Pure pigments or mixtures of pigments can be used.

The silicone-containing paint compositions of this invention can, moreover, contain non-aqueous solvents and dispersing agents, in addition to water, organopolysiloxanes (a), ethylene-vinyl chloride copolymers (b) and pigments (c). Examples of such solvents are hydrocarbons, such as toluene and homologues thereof; chlorohydrocarbons, such as trichloroethylene; ethers, such as di-n-butyl ether; alcohols, such as ethyl alcohol; and ketones, such as methyl ethyl ketone. Examples of dispersing agents are protective colloids, such as polyvinyl alcohol, which may also contain up to 40 mol percent of acetyl groups, gelatine and cellulose derivatives, for example, water-soluble methylcellulose; ammonium and alkali metal salts of polyacrylates (for example, Pigment Disperser A, BASF); anionic emulsifiers, such as alkali metal and ammonium salts of fatty acids, organic sulphonic acids or acid sulphuric acid esters, such as sodium laurate, sodium isopropylnaphthalenesulphonate and lauryl alcohol-sulphonate; cationic emulsifiers, such as stearyl ammonium chloride, and non-ionic emulsifiers, such as sorbitol monolaurate and polyoxyethylene ethers of fatty alcohols or aromatic hydroxy compounds. The dispersing agents are preferably used in an amount of from 0.1 to 5 percent, based on the total weight of the organopolysiloxanes and ethylene-vinyl chloride copolymer. Preferred dispersing agents are partly acetylated polyvinyl alcohol and polyoxyethylene ethers of fatty alcohols.

In addition to the constituents mentioned above, the paint compositions of this invention can also contain other additives which are generally employed in paint compositions, such as thickening agents, extenders for pigments, insecticides, fungicides, light stabilizers, water-soluble dyestuffs, anti-settling agents, plasticizers, and condensation catalysts for the organopolysiloxanes.

The paint compositions of this invention preferably contain less than 0.1 percent and more preferably less than 0.02 percent by weight of alkali metal salts of silicic acid or methylsilicic acid, based on the sum of the weights of organopolysiloxanes (a) and ethylene-vinyl chloride copolymer (b).

The water content of the dispersions can range from, for example, 20 to 100 percent, preferably from 30 to 65 percent, based on the total weight of the other above-mentioned constituents, except water.

The paint compositions of this invention can be applied to interior and exterior surfaces, for example on wood or metals, such as iron, but in particular on brick walls, concrete, masonry containing mortar based on lime and sand, natural stone and other building materials, for example, those containing silicates. They can be applied in any desired manner, for example, by brushing, spraying or dipping.

The paint compositions of this invention give wipe proof, chalk-resistant paint films which have a high water repellency and are resistant to weathering and have excellent permeability to air and water vapour.

In the following examples all parts and percentages are by weight unless otherwise specified.

EXAMPLE 1

A silicone paint resin was prepared by mixing
180 parts of water
0.5 parts of pigment disperser
2.5 parts of fungicide
397 parts of chalk
60 parts of titanium dioxide
55 parts of a 3 percent smectite suspension
70 parts of talc
175 parts of an approximately 43 percent strength aqueous silicone resin dispersion having monoalkylsiloxane units, the alkyl groups of which are methyl and isooctyl groups (commercially available under the tradename BS 43 from Wacker-Chemie GmbH)
10 parts of an approximately 50 percent aqueous dispersion of a polydiorganosiloxane, the organic groups of which are 99.3 mol percent methyl groups and 0.7 mol percent N-(2-aminoethyl)-3-amino-n-propyl groups and having a viscosity at 25° C. of about 450 mm²/second, and 50 parts of an approximately 51 percent aqueous ethylene-vinyl chloride copolymer dispersion (commercially available as Vinnapas LL500 from Wacker-Chemie GmbH).

EXAMPLE 2

Example 1 was repeated, except that only 170 parts of water were used instead of 180 parts of water, 20 parts of an approximately 51.3 percent aqueous dispersion of the same polydiorganosiloxane were used instead of the 10 parts of an approximately 50 percent aqueous polydiorganosiloxane dispersion.

The silicone paints prepared in accordance with the examples were examined for the following properties:
  (a) Storage stability: A sample containing 50 g of the paint was kept 1 day at room temperature and then in a tightly closed glass vessel at 50° C. for 28 days.
  (b) Permeability to water vapour: The paints were subjected to testing in accordance with DIN 52 615 (test method 9).
  (c) Degree of chalking: Determined in accordance with DIN 53223.
  (d) Capillary uptake of water: Determined in accordance with DIN 52617 E.

Each of the samples were storage-stable according to (a) and showed a permeability to water vapour of between 95 and 98 percent, no dry or wet chalking and little capillary uptake of water, expressed by a w value of $w \leq 0.1$ kg/(m²h^{0.5}) was observed.

What is claimed is:

1. A masonry paint composition containing an aqueous dispersion of
  (a) an organopolysiloxane of the formula $$R_nSi(OR')_mO_{\frac{4-n-m}{2}} \quad (I)$$

where R is a hydrocarbon radical having from 1 to 18 carbon atoms which may be substituted by amine or halogen radicals and the hydrocarbon chain may be interrupted by amino groups or oxygen atoms, R' is selected from the group consisting of hydrogen atoms and alkyl radicals having from 1 to 3 carbon atoms, m is a number having an average of from 0 to 0.5, n is a number having an average of from 0.5 to 2.2 and the sum of m and n should not exceed 3, and
  (b) an organic polymer which does not exceed the weight of the organopolysiloxane (a), in which the organic polymer (b) is an ethylene-vinyl chloride copolymer.

2. The paint composition of claim 1, wherein the organopolysiloxane (a) is a mixture containing at least one silicone resin of the formula $$R''SiO_{3/2}, \quad (II)$$

where R'' is a hydrocarbon radical having from 1 to 10 carbon atoms and at least one polydiorganosiloxane of the formula $$R'''_3SiO-(SiO)_x SiR'''_3 \quad (III)$$
$$\quad\quad\quad\quad |$$
$$\quad\quad\quad\quad R'''$$

where R''' is a radical selected from the group consisting of an amino and an aminoalkyl substituted alkyl radical having a total of from 1 to 10 carbon atoms and x is an integer having an average of 60.

3. The paint composition of claim 1, wherein the ethylene-vinyl chloride copolymer (b) contains from 1 to 50 percent by weight of ethylene and from 99 to 1 percent by weight of at least one other monomer, in which the other monomer consists of from 60 to 100 percent by weight of vinyl chloride and from 40 to 0 percent by weight of a monomer other than ethylene and vinyl chloride.

4. The paint composition of claim 2, wherein the ethylene-vinyl chloride copolymer (b) contains from 1 to 50 percent by weight of ethylene and from 99 to 1 percent by weight of at least one other monomer, in which the other monomer consists of from 60 to 100 percent by weight of vinyl chloride and from 40 to 0 percent by weight of a monomer other than ethylene and vinyl chloride.

5. The paint composition of claim 1, which contains a pigment (c) in addition to components (a) and (b).

6. The paint composition of claim 2, which contains a pigment (c) in addition to components (a) and (b).

7. The paint composition of claim 3, which contains a pigment (c) in addition to components (a) and (b).

8. The paint composition of claim 4, which contains a pigment (c) in addition to components (a) and (b).

9. The paint composition of claims 1, 2, 3, 4, 5, 6, 7 or 8, which contains less than 0.1 percent by weight of alkali metal salts of silicic acid or of methyl silicic acid, based on the sum of the weight of the organopolysiloxane (a) and ethylene-vinyl chloride copolymer (b).

* * * * *

UNITED STATES PATENT AND TRADEMARK OFFICE
CERTIFICATE OF CORRECTION

PATENT NO. : 4,833,187
DATED : May 23, 1989
INVENTOR(S) : Wilhelm Sittenthaler, et al.

It is certified that error appears in the above-identified patent and that said Letters Patent is hereby corrected as shown below:

Column 6, line 21, after "of" insert -- at least --.

Signed and Sealed this

Ninth Day of February, 1993

Attest:

STEPHEN G. KUNIN

*Attesting Officer*   Acting Commissioner of Patents and Trademarks